United States Patent [19]

Yahagi

[11] Patent Number: 5,517,679
[45] Date of Patent: May 14, 1996

[54] MOBILE RADIO TELECOMMUNICATIONS SYSTEM WITH A BATTERY SAVING

[75] Inventor: Masahiko Yahagi, Tokyo, Japan

[73] Assignee: NEC Corporation, Tokyo, Japan

[21] Appl. No.: 312,548

[22] Filed: Sep. 26, 1994

[30] Foreign Application Priority Data

Sep. 27, 1993  [JP]  Japan .................................. 5-239463

[51] Int. Cl.$^6$ ....................................................... H04B 7/26
[52] U.S. Cl. ...................... 455/38.3; 455/54.2; 455/343
[58] Field of Search .................................. 455/38.2, 38.3, 455/54.1, 54.2, 67.1, 68, 70, 343; 379/63

[56] References Cited

U.S. PATENT DOCUMENTS

| | | | |
|---|---|---|---|
| 4,736,461 | 4/1988 | Kawasaki et al. | 455/38.3 |
| 5,276,680 | 1/1994 | Messenger | 455/38.3 |
| 5,351,041 | 9/1994 | Ikata et al. | 455/343 |

FOREIGN PATENT DOCUMENTS

| | | |
|---|---|---|
| 63-199526 | 8/1988 | Japan . |
| 63-262926 | 10/1988 | Japan .................................. 455/38.3 |

OTHER PUBLICATIONS

"Digital Cellular Telecommunication System", RCR Standard, RCR STD-278, pp. 473–480.

*Primary Examiner*—Chi H. Pham
*Attorney, Agent, or Firm*—Sughrue, Mion, Zinn, Macpeak & Seas

[57] ABSTRACT

A mobile radio telecommunications system including mobile stations and base stations and capable of saving power to be consumed by the mobile stations. Both a mobile station and a base station store response times assigned to, among signals to be sent from the mobile station to the base station, signals of the kind needing a response from the base station, so that the time in which a response should be returned from the base station can be controlled. Hence, when the mobile station sends a signal to the base station and waits for a response, it does not have to feed power to a receiver thereof until a particular response time expires. This successfully saves power to be consumed by the mobile station.

4 Claims, 10 Drawing Sheets

| KIND OF SIGNAL (1) | TIME (1) | KIND OF SIGNAL (2) | TIME (2) | ------ | ------ | KIND OF SIGNAL (n) | TIME (n) |

5,517,679

MOBILE RADIO TELECOMMUNICATIONS SYSTEM WITH A BATTERY SAVING

BACKGROUND OF THE INVENTION

The present invention relates to a mobile radio telecommunications system having a battery saving capability and, more particularly, to a mobile radio telecommunications system capable of saving power to be consumed by mobile stations.

Various forms of battery saving system for a mobile radio telecommunications system have been proposed. An intermittent reception system is one form of a conventional battery saving schemes, where it groups a plurality of mobile stations according to certain rules. In this kind of system, a particular time for starting broadcasting terminating call signals is assigned to each group of the mobile stations. A base station starts broadcasting terminating call signals meant for the associated group of mobile stations at the assigned time. The mobile stations receive terminating call signals only during an interval for which, among the terminating call signals being broadcast from the base station, only the signals meant for the subscriber group to which they belong are broadcast. This kind of scheme is disclosed in, for example, "DIGITAL CELLULAR TELECOMMUNICATION SYSTEM", RCR STANDARD, RCR STD-27B, pp. 473–480.

Japanese Patent Laid-Open Publication No. 63-199526, for example, teaches a battery saving system which causes a base station to send system information or terminating call information including timing information. The timing information indicates the time for a mobile station to receive the necessary system information or terminating call information. This kind of system makes it needless for the mobile station to maintain a device thereof for receiving the system information or call terminating information in a reception state at all times. Hence, the power saving feature is achievable even if the interval between the reception of one system information and that of the next system information is not constant.

The systems described above have some issues yet to be solved, as follows. The systems each reduces power to be consumed by a mobile station when the mobile station receives system information or terminating call information being broadcast from a base station. But, a mobile station, which has sent a signal to a base station, does not know beforehand the time when the base station will return a response signal thereto. This forces the mobile station to feed power to a receiver thereof, i.e., prepare it for reception at the earliest time when it may receive a response signal from the base station. As a result, the power consumption of the mobile station is increased in proportion to the delay in the return of the response signal from the base station.

SUMMARY OF THE INVENTION

It is, therefore, an object of the present invention to provide a mobile radio telecommunications system capable of saving power effectively.

It is another object of the present invention to provide a mobile radio telecommunications system capable of reducing power to be consumed by a mobile station.

In accordance with the present invention, in a mobile radio telecommunications system including a mobile station and a base station, the mobile station comprises a mobile station memory for storing a response time in which the base station, received a response request signal from the mobile station, should return a response signal to the mobile station, a mobile station timer, and a mobile station controller for sending the response request signal requesting the base station to return the response signal, and for reading the response time assigned to the response request signal out of the mobile station memory, setting a power feed start time based on the response time on the timer, starting feeding power to a receiver of the mobile station on detecting that the timer has exceeded the power feed start time, and stopping feeding power on the reception of the response signal. The base station comprises a base station memory, a base station timer, and a base station controller for causing the mobile station memory to store the response time while storing it in the base station memory, and for reading, on receiving the response request signal from the mobile station, the response time assigned to the response request signal out of the base station memory, setting the response time on the base station timer, and sending the response signal to the mobile station on detecting that the base station timer has exceeded the response time.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

To better understand the present invention, a brief reference will be made to a conventional battery saving system, shown in FIG. 1. As shown, assume that a mobile station has sent a registration request signal. The mobile station will then expect a response from the base station. In the figure, a receiver and a transmitter included in the mobile station are respectively labeled RX1 and TX1, while a receiver and a transmitter included in the base station are respectively labeled RX0 and TX0. Just after the transmitter TX1 has sent the registration request signal, the mobile station starts feeding power to the receiver RX1 and waits for a response signal from the base station. Assume that the base station has returned a response signal to the mobile station via the transmitter TX0 thereof on the elapse of eight unit times Δt since the arrival of the registration request signal. Then, the receiver RX1 of the mobile station consumes power over the eight unit times before the reception of the response and then over two unit times during and after the reception.

Figure 1:
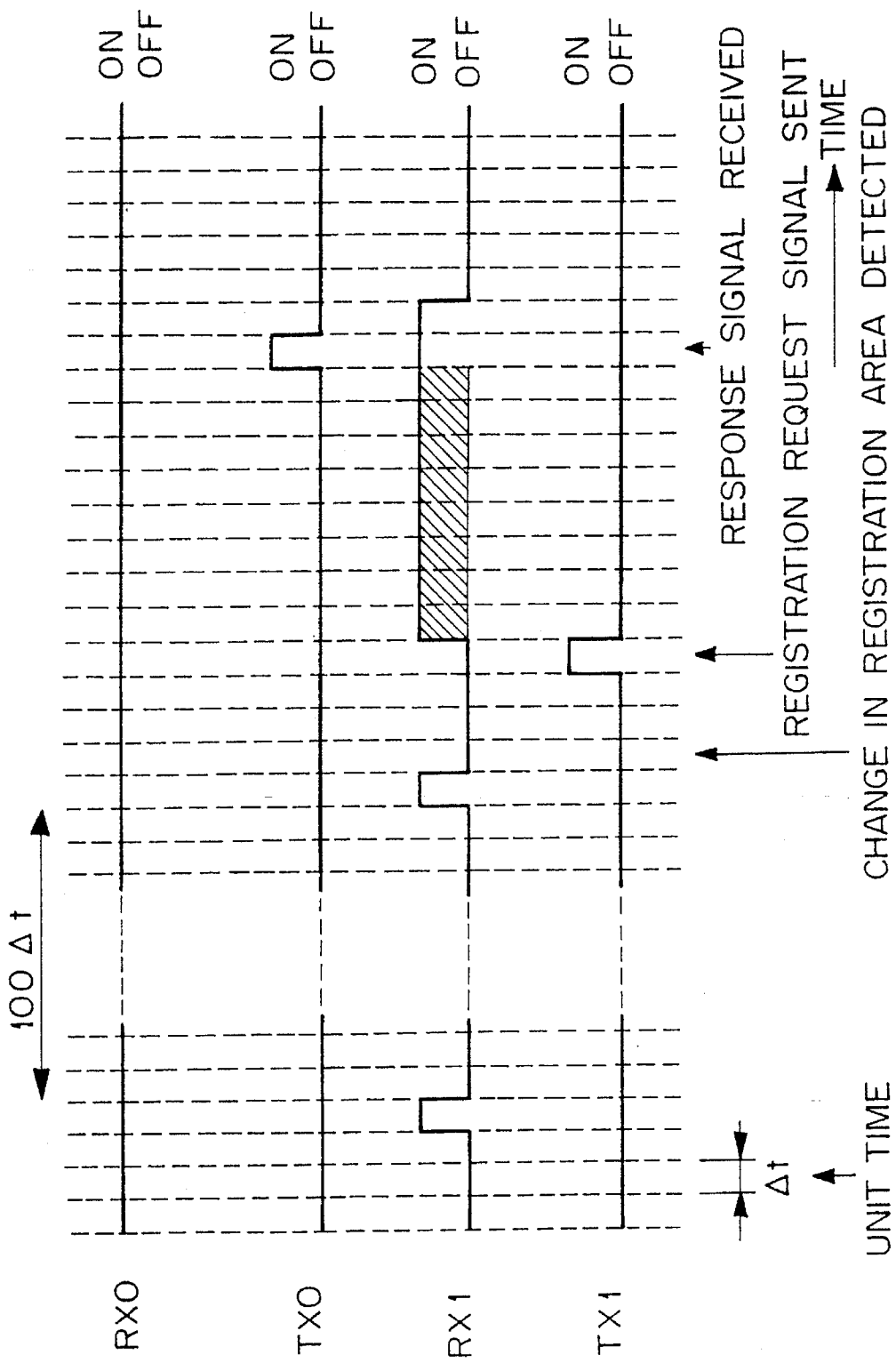
FIG. 1 is a timing chart representing a procedure in which a conventional battery saving system feeds power to a receiver included in a mobile station.

The conventional battery saving procedure shown in FIG. 1 has the following problem. The time when the transmitter TX0 of the base station returns a response signal to the mobile station is not always constant. Hence, the mobile station has to start feeding power to the receiver RX1 thereof at the earliest time when the base station may send the response signal, thereby preparing for the reception of the response signal.

Figure 2:
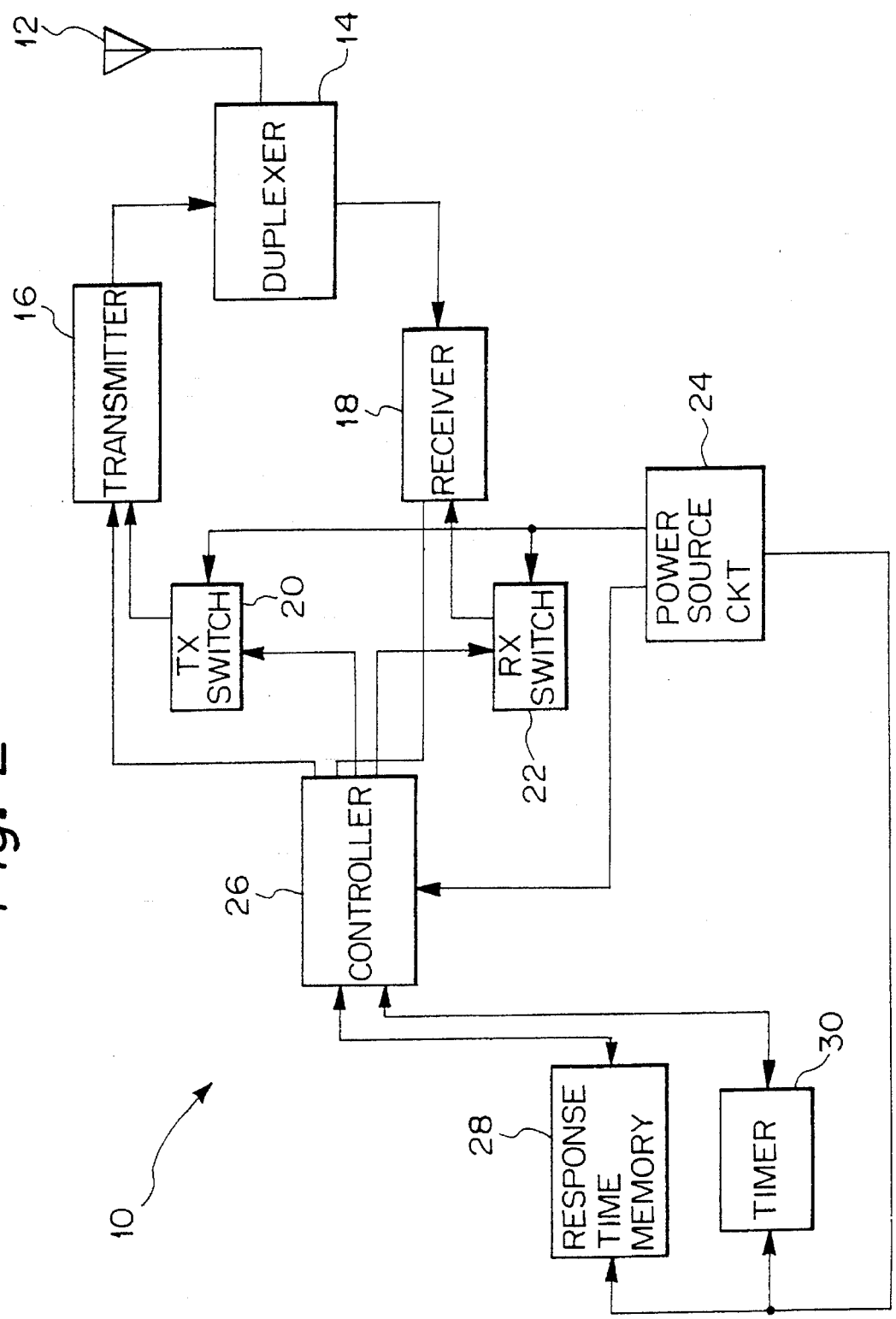
FIG. 2 is a block diagram schematically showing a mobile station included in a mobile radio telecommunications system embodying the present invention.

Referring to FIG. 2, a mobile radio telecommunications system embodying the present invention, particularly a mobile station thereof, is shown in a schematic block diagram. As shown, the mobile station, generally 10, has an antenna 12, an antenna duplexer 14, a power source circuit 24, and a controller 26. A transmitter 16 amplifies a signal to be sent while a receiver 18 receives information meant for the mobile station. A transmission (TX) switch 20 starts and stops feeding power to the transmitter 16 under the control of the controller 26. Likewise, a reception (RX) switch 22 starts and stops feeding power to the receiver 18 under the control of the controller 26. A response time memory 28 stores periods of time each of which will expire before the reception of a response signal to a particular signal sent from the mobile station 10, i.e., response times. A timer 30 counts a period of time corresponding to a value set thereon and, informs the controller 26 of the elapse thereof.

Figure 3:
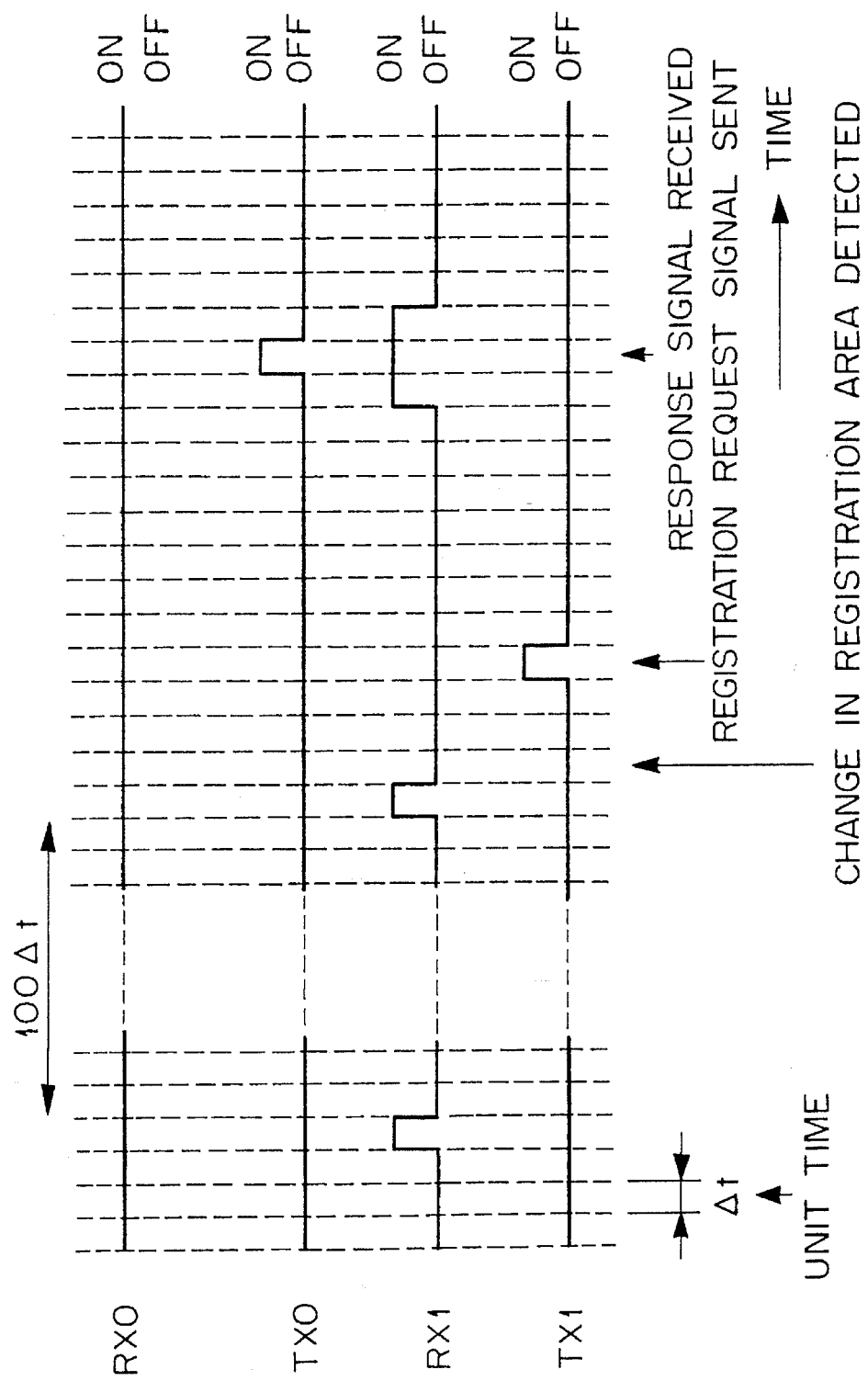
FIG. 3 is a timing chart demonstrating a specific operation of the embodiment.

A specific operation of the embodiment will be described with reference to FIGS. 3–6. In FIG. 3, labels RX0 and TX0 respectively represent a receiver and a transmitter included in a base station, while labels RX1 and RX2 respectively represent the receiver 18 and transmitter 16 included in the mobile station 10. Assume that the base station broadcasts, to each service area, information for the identification of the service area for a unit time (e.g., 1 millisecond) every 100 unit times Δt, as an example. The mobile station feeds power to the receiver RX1 thereof for the unit time Δt every 100 unit times Δt in synchronism with the broadcast from the base station. The mobile station identifies, based on the information from the base station, the service area in which it is located. Subsequently, the mobile station registers at registering means a location indicative of the identified service area.

When the mobile station moves from one service area to another service area, it has to register at the registering means a location indicative of the new service area, so that the base station can identify it. For this purpose, the mobile station feeds power to the transmitter TX1 for the unit time Δt so as to send a registration request signal to the base station. Thereafter, the mobile station does not start feeding power to the receiver RX1 immediately, but it starts feeding power on the elapse of seven unit times Δt.

When eight unit times Δt expire since the transmission of the registration request from the mobile station, the base station returns a response signal to the mobile station by energizing the transmitter TX0 thereof. At this instant, the mobile station has started feeding power to the receiver RX1 one unit time Δt before the return of the response signal from the base station and is, therefore, ready to receive the response signal. The mobile station receives the response signal from the base station and then stops feeding power to the receiver RX1. Specifically, as shown in FIG. 3, the receiver RX1 consumes power for only three unit times Δt for the identification of a service area.

Figure 4:
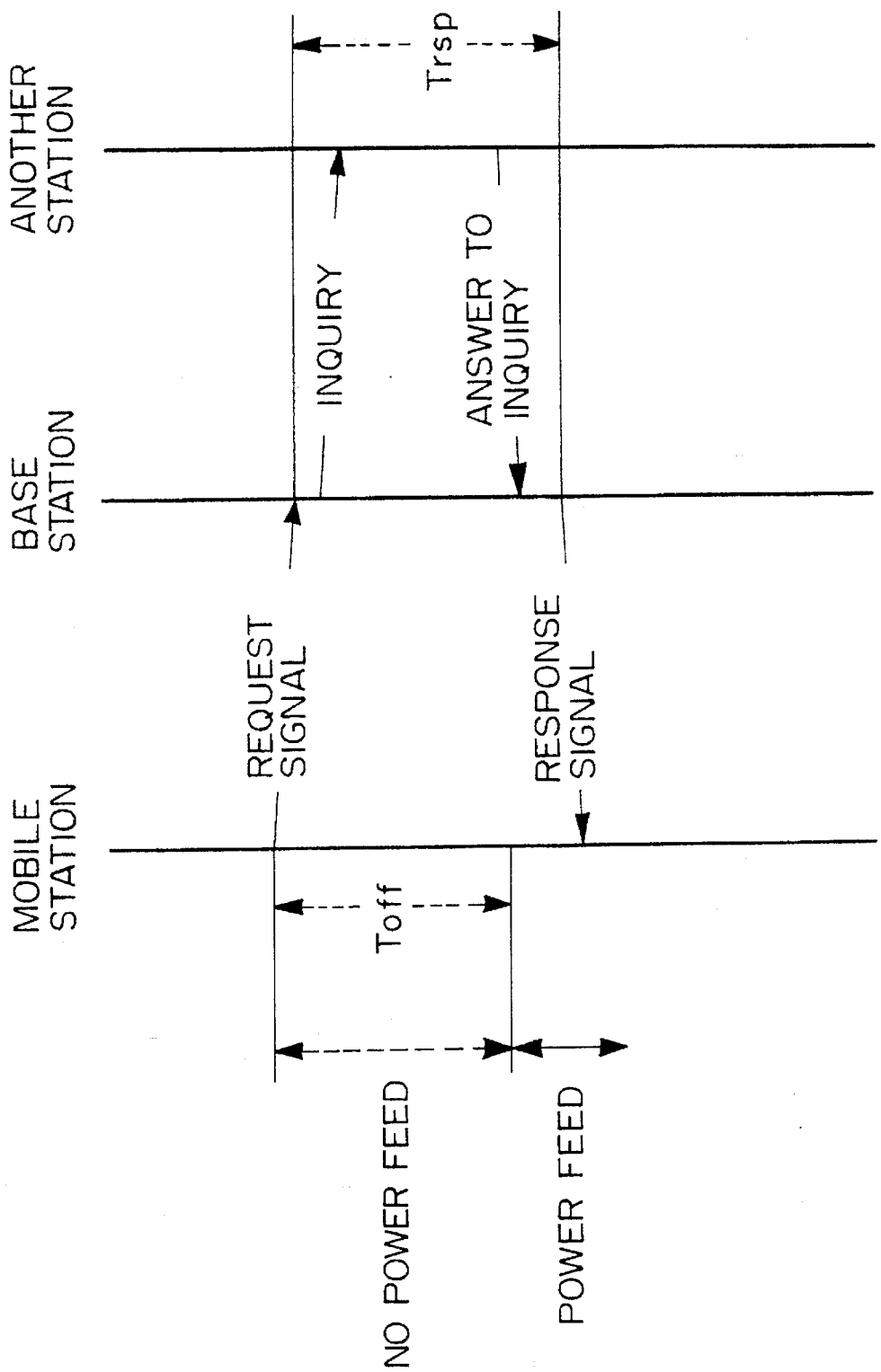
FIGS. 4, 5 and 6 respectively show a first, second and third specific request and response sequence to occur in the embodiment.

FIG. 4 shows a first specific request and response sequence in which the base station becomes ready to send the response signal to the registration request from the mobile station on the elapse of a response time Trsp. In this case, the mobile station does not feed power to the receiver RX1 for a period of time Toff since the transmission of the request signal, starts feeding power to the receiver RX1 on the elapse of the period of time Toff, identifies a service area in response to the response signal from the base station, and then stops feeding power to the receiver RX1. On the other hand, the base station returns the response signal to the mobile station immediately on the elapse of the response time Trsp.

Figure 5:
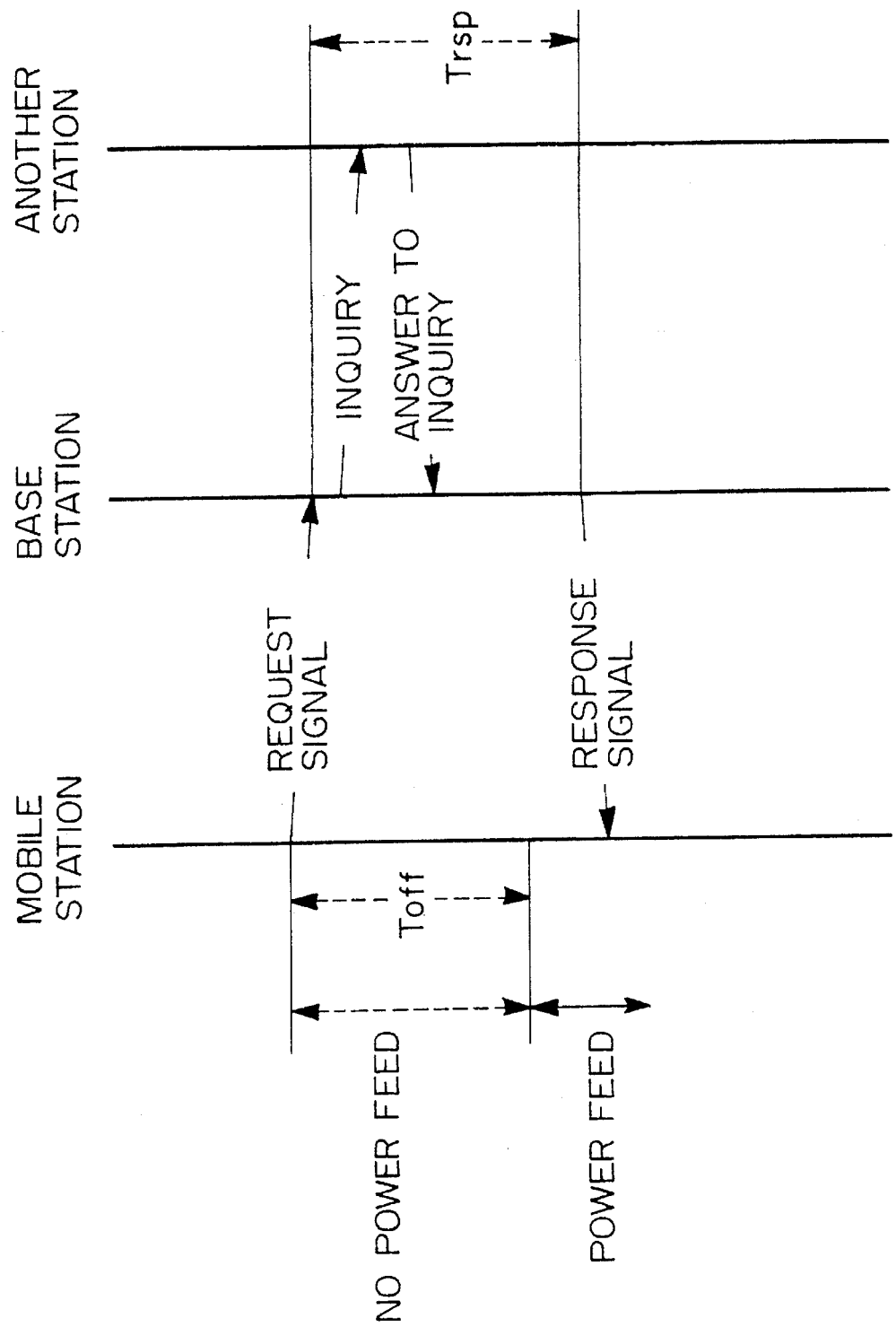

FIG. 5 shows a second specific request and response sequence in which the base station becomes ready to send the response signal to the registration request before the response time Trsp expires. As shown, the mobile station feeds power to the receiver RX1 in the same manner as in the first sequence shown in FIG. 4. Although the base station is ready to return the response to the mobile station before the period of time Trsp expires, it holds in until the period of time Trsp expires. On the elapse of the response time Trsp, the base station returns the response to the mobile station immediately.

Figure 6:
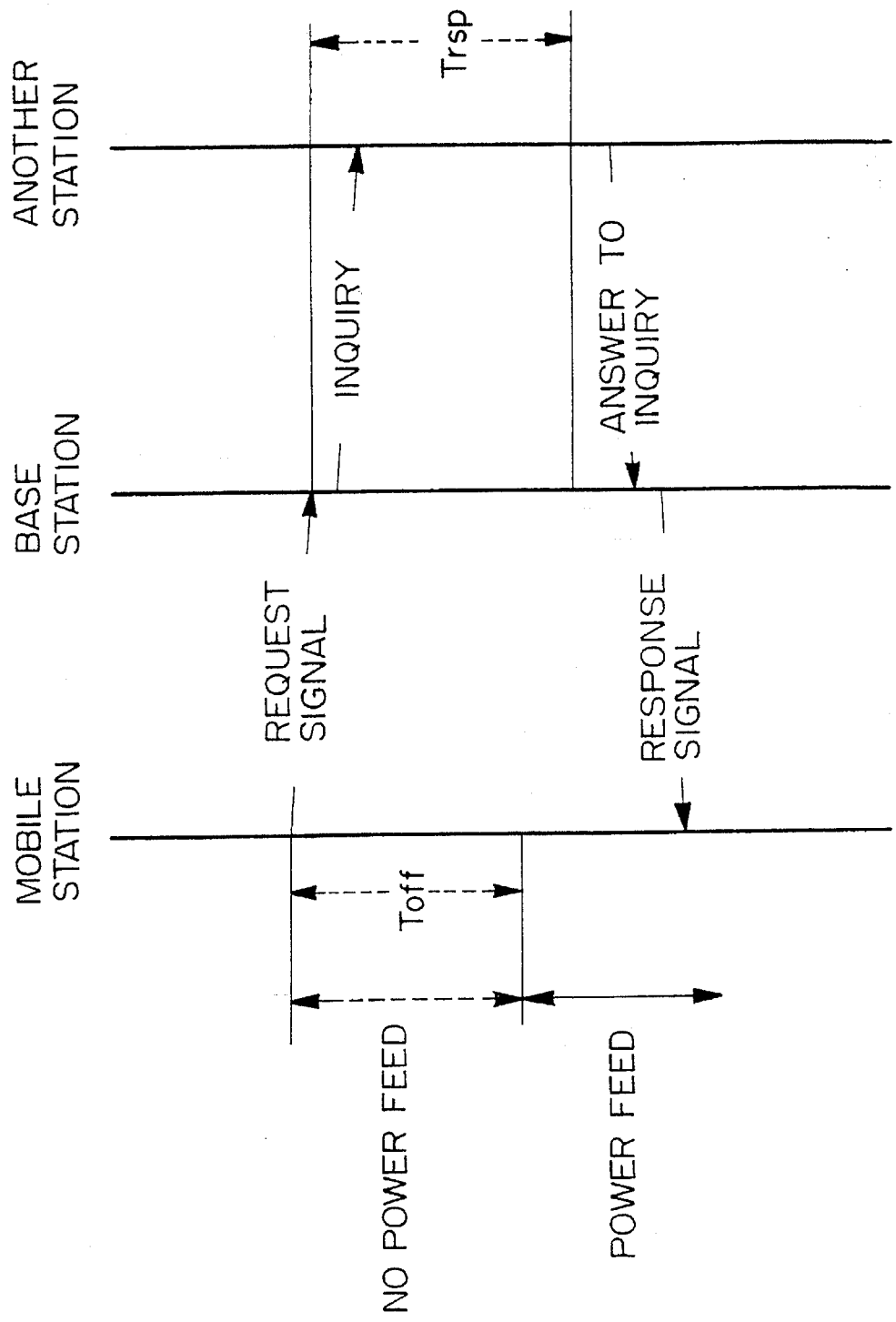

FIG. 6 shows a third specific request and response sequence in which the base station is unable to send the response signal to the mobile station even on the elapse of the response time Trsp. The mobile station feeds power to the receiver RX1 in the same manner as in the sequence of FIG. 4, except that the duration of power feed is extended due to the delay in the arrival of the response signal. The base station does not send the response signal to the mobile station even on the elapse of the response time Trsp, but it sends it as soon as it becomes ready to do so. On receiving the response signal, the mobile station stops feeding power to the receiver RX1.

Figure 7:
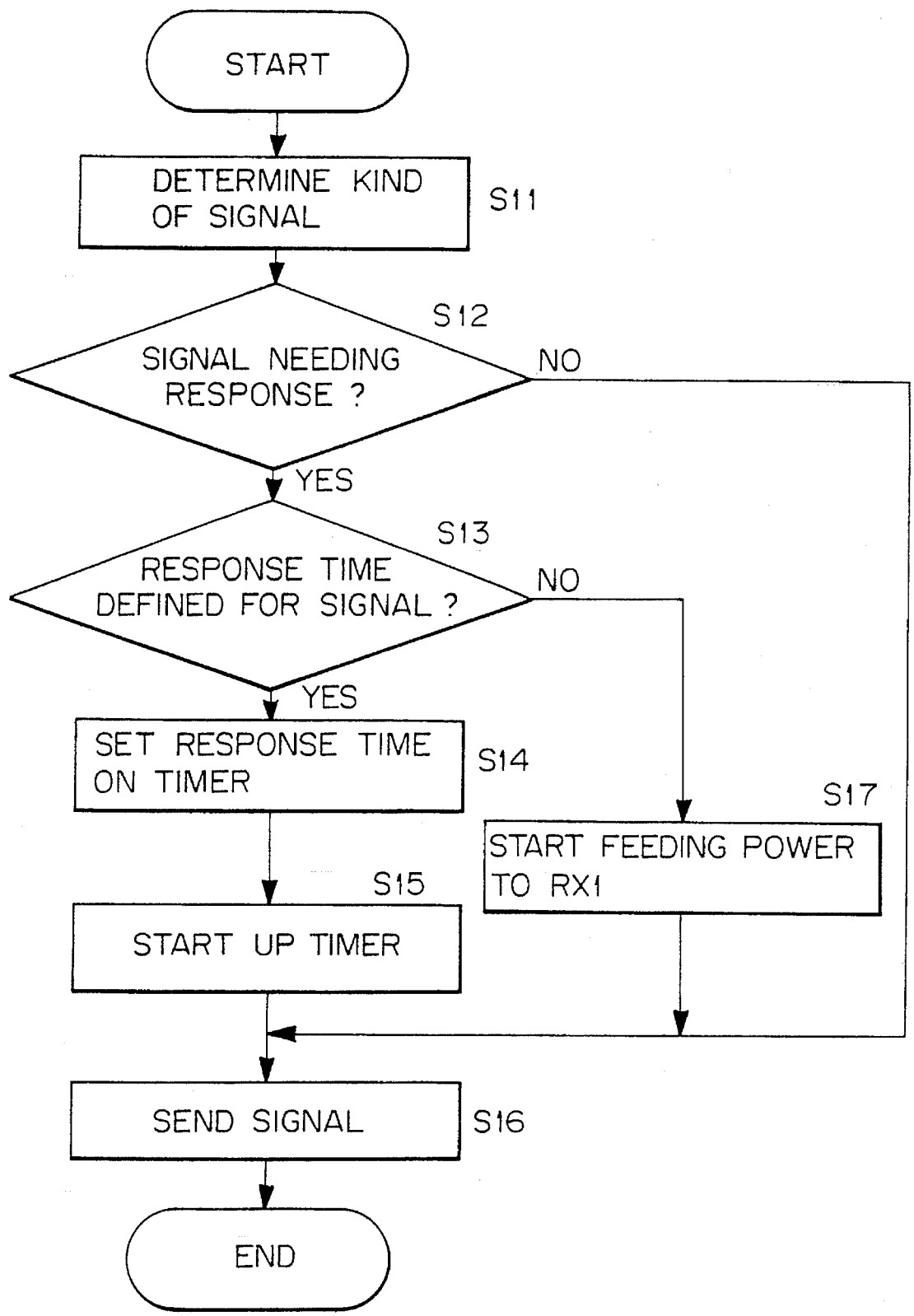
FIG. 7 is a flowchart showing a transmission procedure particular to the mobile station included in the embodiment.

A reference will be made to FIGS. 7–11 for describing a specific operation of the illustrative embodiment. FIG. 7 shows a procedure which the mobile station executes when it has to send a signal to the base station. As shown, the mobile station determines the kind of a signal to be sent to the base station (step S11) and then determines whether or not the signal is of the kind needing a response signal from the base station (step S12). If the answer of the step S12 is positive, Y, the mobile station references storing means, not shown, which stores response times each being assigned to a particular kind of signal. As a result, the mobile station sees if any response time is assigned to the signal to be sent (step S13). If a response time is defined for the signal in the storing means (Y, step S13), the mobile station sets the response time on a timer (step S14), starts timer (step S15), sends the signal (e.g., registration request signal) (step S16), and then ends the procedure. If the signal to be sent does not need a response from the base station as determined in the step S12, the mobile station sends it immediately (step S16) and then ends the procedure. If no response times are assigned to the signal as determined in the step S13, the mobile station starts feeding power to the receiver RX1 immediately (step S17), sends the signal (step S16), and then ends the program.

Figure 8:
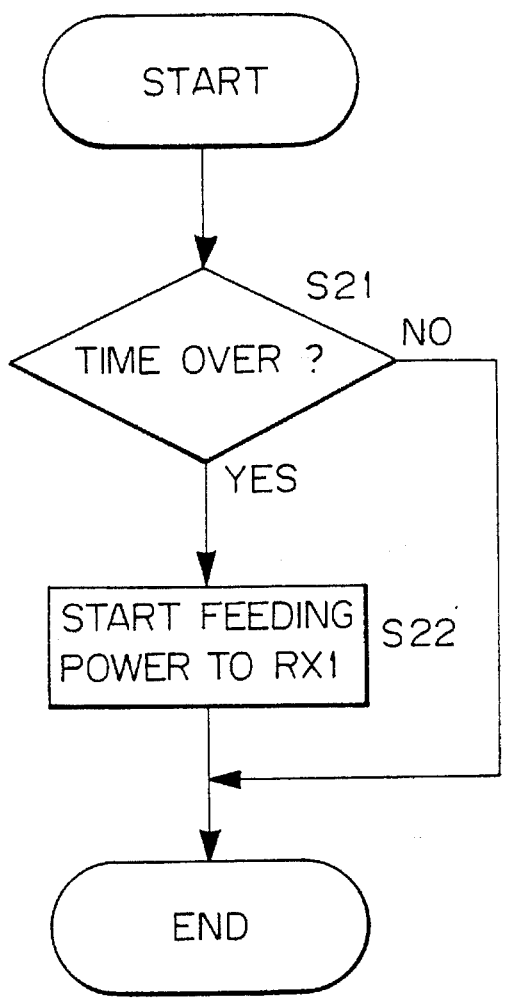
FIG. 8 is a flowchart showing a power feed procedure also particular to the mobile station.

FIG. 8 shows how the mobile station stops feeding power to the receiver RX1 on detecting the elapse of the time set on the timer. As shown, after starting the timer in the step S15, the mobile station determines whether or not the response time set on the timer has expired (step S21). If the answer of the step S21 is negative, N, the mobile station stops the processing. However, if the answer of the step S21 is positive, Y, the mobile station starts feeding power to the receiver RX1 (step S22) so as to prepare it for the reception of the response signal from the base station.

Figure 9:
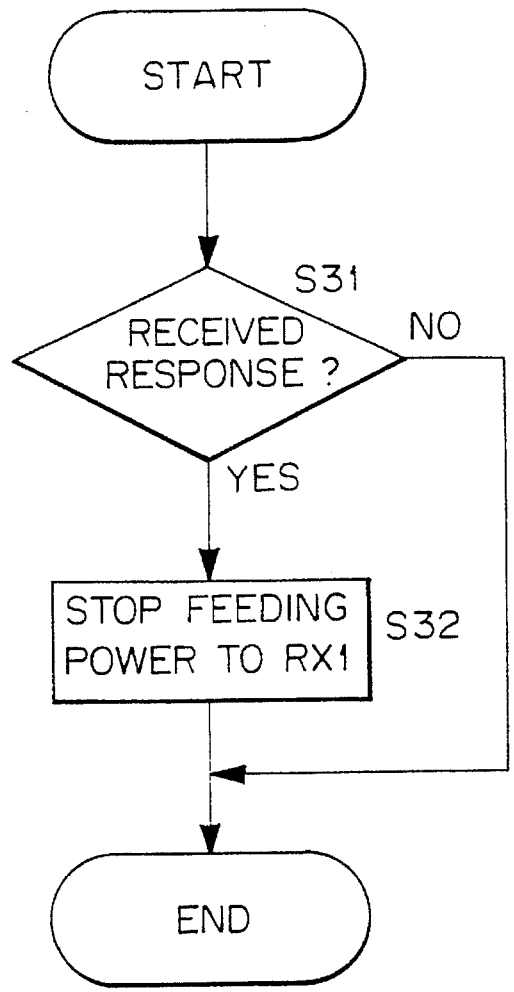
FIG. 9 is a flowchart showing a procedure for stopping feeding power to the mobile station.

On receiving the response signal from the base station, the mobile station stops feeding power to the receiver RX1, as shown in FIG. 9. As shown, the mobile station determines whether or not it has received the expected response signal (step S31). If the response has not arrived, the mobile station ends the processing without changing the power feed state to the receiver RX1. If the response has arrived, the mobile station stops feeding power to the receiver RX1 (step S32) as soon as the reception ends, and then ends the procedure.

Figure 10:
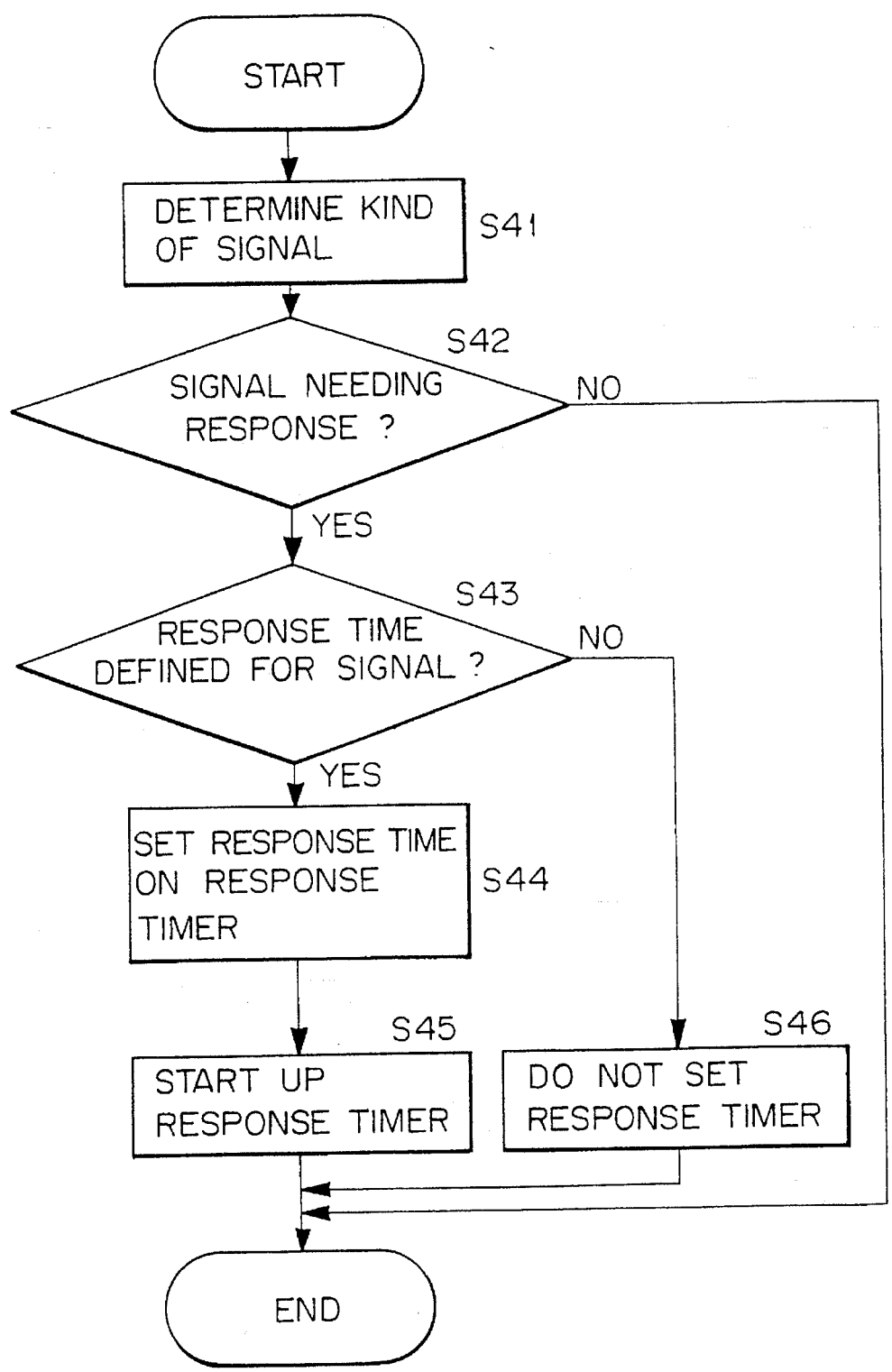
FIG. 10 is a flowchart showing a reception procedure to be executed by a base station also included in the embodiment.

FIG. 10 shows a control procedure which the base station executes on receiving a signal from the mobile station. As shown, the base station, received a signal from the mobile station, determines the kind of the signal (step S41). The base station references storing means, not shown, to see if the received signal needs a response signal from the base station (step S42). If the answer of the step S42 is negative, N, the base station ends the processing. If the answer of the step S42 is positive, Y, the base station determines whether or not any response time is defined for the received signal (step S43). If the answer of the step S43 is negative, N, the base station ends the processing without setting a response timer (step S46). If the answer of the step S43 is positive, Y, the base station sets a response time assigned the received signal on the response timer (step S44), starts it up, and then ends the processing.

Figures 11, 12:
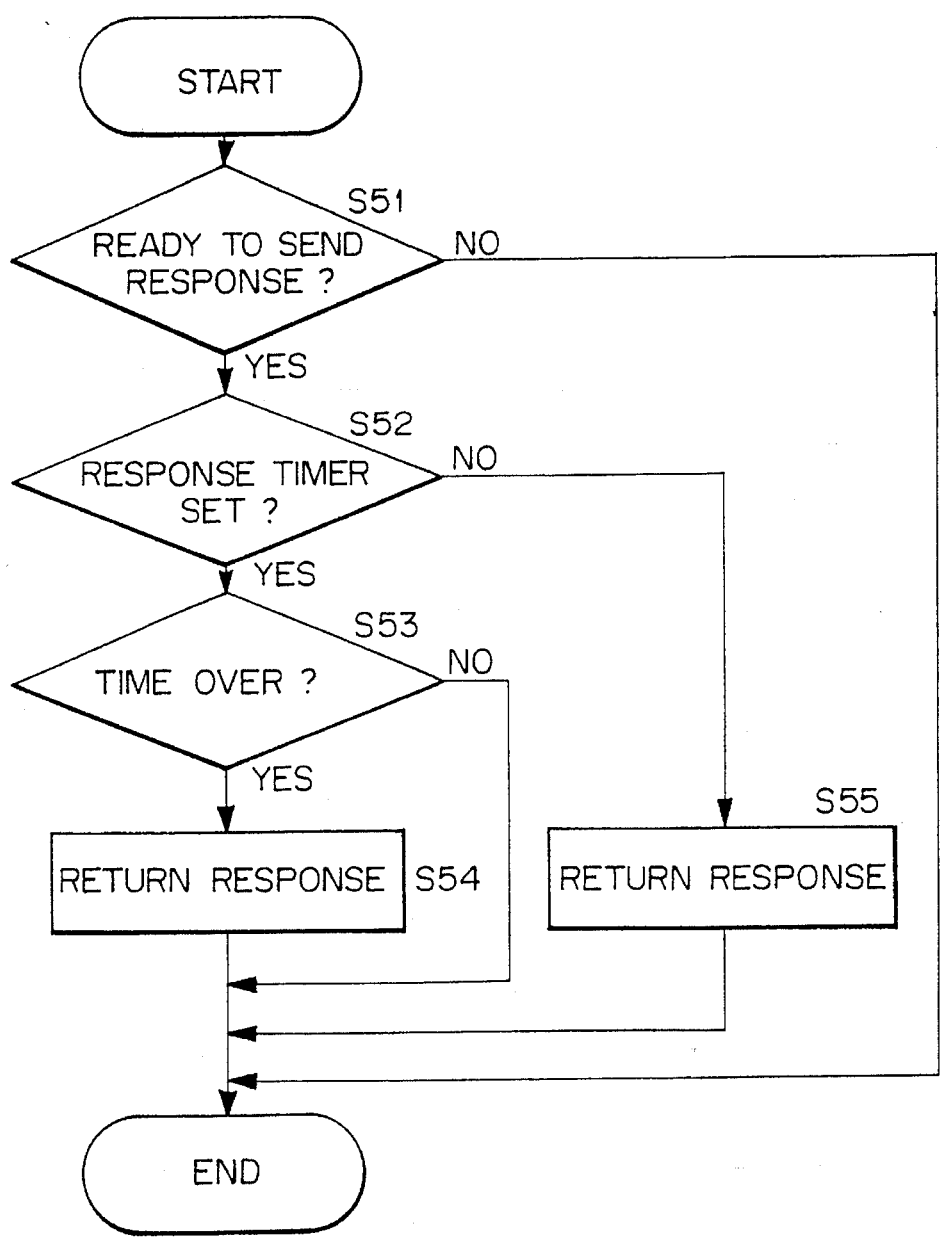
FIG. 11 is a flowchart showing a transmission procedure to be also executed by the base station.
FIG. 12 shows a specific data format in which information are sent from the base station to the mobile station.

FIG. 11 demonstrates a procedure in which the base station sends the response signal to the mobile station. As shown, the base station determines whether or not the response signal to be sent to the mobile station is present, i.e., whether or not it is ready to send it to the mobile station (step S51). If the base station is not ready to send the response (N, step S51), it ends the processing. If the answer of the step S51 is positive, Y, the base station determines whether or not the response timer has been set in the step S44, FIG. 10, (step S52). If the answer of the step S52 is negative, N, the base station sends the response signal to the mobile station immediately (step S55). If the answer of the step S52 is positive, Y, the base station determines whether or not the response timer has counted up the response time (step S53). If the answer of the step S53 is negative, N, the base station ends the processing without sending the response signal to the mobile station. If the answer of the step S54 is positive, Y, the base station sends the response to the request signal from the mobile station (step S54) and then ends the procedure.

FIG. 12 shows a specific data format containing the kinds of signals (1) to (n) and response start times (1) to (n) respectively assigned to the kinds of signals (1) to (n). These information will be sent from the base station to the mobile station when the latter sends a signal to the former. Among signals to be sent from the mobile station to the base station, a plurality of signals will be followed by response signals from the base station. For example, when the mobile station detects a change in the location area, it sends a registration request signal to the base station; the base station returns a permission signal or an inhibition signal to the mobile station. When a call is originated on the mobile station, the mobile station sends, for example, an originating call request signal to the base station; the base station returns a permission signal, inhibition signal, or channel assignment signal by way of example.

The contents of the response signals from the base station are each identified or generated by a particular element constituting the mobile telecommunications system. Therefore, the response time may differ from one request from the mobile station to another request. In FIG. 2, the kinds of signals (1) to (n) each corresponds to a respective request signal while the times (1) to (n) each indicates a period of time in which a response to a particular request will be returned to the mobile station. With these information, both the base station and the mobile station can store the same periods of time representative of such response times.

In summary, in a mobile radio telecommunications system in accordance with the present invention, both a mobile station and a base station store response times assigned to, among signals to be sent from a mobile station to a base station, signals of the kind needing a response from the base station, so that the time in which a response should be returned from the base station can be controlled. Hence, the mobile station, sent a signal to the base station and waiting for a corresponding response, does not have to feed power to a receiver thereof until a particular response time expires. This successfully saves power to be consumed by the mobile station.

Various modifications will become possible for those skilled in the art after receiving the teachings of the present disclosure without departing from the scope thereof.

What is claimed is:

1. In a mobile radio telecommunications system including a mobile station and a base station, said mobile station comprising:

mobile station storing means for storing a response time in which said base station, responding to a response request signal from said mobile station, should return a response signal to said mobile station;

mobile station time counting means; and mobile station control means for sending the response request signal requesting said base station to return the response signal, and for reading the response time assigned to said response request signal out of said mobile station storing means, said mobile station control means further comprising means, based on the response signal, for setting said mobile station time counting means with a power feed start time, means for providing power to a receiver of said mobile station upon the elapse of the power feed start time based on an output of said mobile station time counting means, and means for removing power from the receiver upon reception of said response signal;

said base station comprising:

base station storing means;

base station time counting means; and base station control means for storing said response time in said base station storing means, and for reading, upon receiving the response request signal from said mobile station, the response time assigned to said response request signal out of said base station storing means, said base station control means further comprising means for setting said response time on said base station counting means, and means for sending the response signal to said mobile station on detecting that said base station time counting means has exceeded said response time.

2. A system as claimed in claim 1, wherein the time defined by the power feed start time is less than the response time associated with said power feed start time.

3. A system as claimed in claim 1, wherein a particular response time is assigned to each of a plurality of response request signals.

4. A system as claimed in claim 1, wherein said base station control means further comprises means for setting a return slot for returning the response signal on the elapse of the response time and a non-return time slot for not returning said response signal, means for causing said base station storing means to store said return time slot and said non-return time slot, means for sending the response signals intermittently in the return time slots, such that said mobile station receives said response signals intermittently.

* * * * *

UNITED STATES PATENT AND TRADEMARK OFFICE
CERTIFICATE OF CORRECTION

PATENT NO. : 5,517,679
DATED : May 14, 1996
INVENTOR(S) : Masahiko YAHAGI

It is certified that error appears in the above-indentified patent and that said Letters Patent is hereby corrected as shown below:

On the Title page, Item [54] "Title":

In the Title, after "SAVING" insert --CAPABILITY--.

Column 2, line 46, delete "i s" and insert --is--.

Column 2, line 62, after "signal" insert --to the base station--.

Signed and Sealed this

Third Day of September, 1996

Attest:

BRUCE LEHMAN

*Attesting Officer*          Commissioner of Patents and Trademarks